United States Patent [19]

Masuyama et al.

[11] Patent Number: 4,972,302

[45] Date of Patent: Nov. 20, 1990

[54] VEHICLE LAMP HAVING INNER LENS AND REFLECTOR

[75] Inventors: Koichi Masuyama, Yokohama; Yoshiro Honda, Chigasaki; Toshio Miyokawa, Tokyo; Hirokuni Osugi, Kamakura, all of Japan

[73] Assignee: Stanley Electric Co., Ltd., Tokyo, Japan

[21] Appl. No.: 380,982

[22] Filed: Jul. 14, 1989

[30] Foreign Application Priority Data

| Jul. 18, 1988 | [JP] | Japan | 63-94703 |
| Nov. 1, 1988 | [JP] | Japan | 63-277005 |
| Nov. 1, 1988 | [JP] | Japan | 63-277006 |

[51] Int. Cl.⁵ ............................................. B60Q 1/00
[52] U.S. Cl. ................................... 362/61; 362/268; 362/308; 362/346; 362/327
[58] Field of Search ............... 362/61, 80, 268, 347, 362/327, 328, 331, 339, 346, 326, 341, 349, 249, 247, 296, 297, 308, 309

[56] References Cited

U.S. PATENT DOCUMENTS

| 3,798,444 | 3/1974 | Brudy | 362/328 |
| 4,423,475 | 12/1983 | Bartel | 362/80 |
| 4,558,402 | 12/1985 | Tysoe | 362/61 |
| 4,577,260 | 3/1986 | Tysoe | 362/61 |
| 4,670,823 | 6/1987 | Kochi et al. | 362/268 |
| 4,729,075 | 3/1988 | Brass | 362/346 |

FOREIGN PATENT DOCUMENTS 2091864  8/1982  United Kingdom ................. 362/61

Primary Examiner—Ira S. Lazarus
Assistant Examiner—D. M. Cox
Attorney, Agent, or Firm—Frishauf, Holtz, Goodman & Woodward

[57] ABSTRACT

A vehicle lamp having inner and outer lenses and a reflector mirror surface. The inner lens is a Fresnel lens for converting light beams from a light source into parallel light beams, and the outer lens is an ordinary lens for obtaining a desired divergence property of the lamp. The reflector mirror may be a plane mirror, a mirror of a truncated cone shape, or a mirror of a parabolic cylinder shape. The Fresnel lens has as its focal point the virtual image of the light source as obtained by the reflector mirror, thus realizing a compact and small depth housing of the lamp while effectively using the light beams.

7 Claims, 4 Drawing Sheets

VEHICLE LAMP HAVING INNER LENS AND REFLECTOR

BACKGROUND OF THE INVENTION

The present invention relates to a vehicle lamp such as a vehicle tail lamp, a turn signal lamp and a stop lamp, and more particularly to a compact vehicle lamp having inner and outer lenses and a reflector.

There are known vehicle lamps such as tail lamps, turn signal lamps and stop lamps excluding head lamps, which have an inner lens for converting light beams from a light source to parallel light beams. An example of such a conventional vehicle lamp is shown in FIG. 1. This known vehicle lamp comprises a bulb 2 mounted within a housing 1 along an optical axis 0—0, an inner lens 3 and an outer lens 4. The inner lens 3 is a Fresnel cut lens which refracts the light beams from a light emitting point P of the bulb filament and transmits parallel light beams. The outer lens 4 covers the inner lens 3 and has a cutting shape suitable for obtaining a desired divergence property of the transmitted light beams. The focal distance F of the inner lens 3 is generally set at the distance between the inner surface of the inner lens 3 and the light emitting point P of the bulb filament.

The vehicle lamp constructed as above, however, has been found unsatisfactory in the following points. First, since the size, particularly the depth, of the housing 1 of the vehicle lamp is dependent upon the focal distance F of the inner lens 3, if the focal distance F is made short in order to make the vehicle lamp more compact, the incident angle to the inner lens 3 of light beams becomes small, so that the amount of light at the peripheral portion of the inner lens 3 becomes small. Therefore, in practice there is a limit in reducing the size, particularly the depth, of the known vehicle lamp. Second, the vehicle lamp using the inner and outer lenses is less efficient in transmitting the light beams emitted from the bulb when compared to those lamps using a reflector.

SUMMARY OF THE INVENTION

It is therefore an object of the present invention to provide a vehicle lamp having a small depth while still retaining a good illumination surface even at the peripheral portion of the inner lens, in addition to having the advantage obtained by using a reflector.

In order to achieve the above object of the present invention, according to one aspect of the present invention, there is provided a vehicle lamp comprising: a bulb mounted within a housing along an optical axis thereof; an inner lens for transmitting light beams emitted from said bulb in the form of parallel light beams; an outer lens for diverging said transmitted light beams in desired directions; and a plane mirror or reflector formed on the inner surface of said housing at a position corresponding to the back of said bulb; and wherein said inner lens is mounted at a position spaced by the focal distance thereof from a virtual image point of a filament light emitting point of said bulb.

Since the plane mirror is formed on the inner surface of the housing at the position corresponding to the back of the bulb, the virtual image point of the light emitting point of the bulb is set at the position equal to the focal distance of the inner lens so that the depth of the housing of the vehicle lamp can be made smaller without causing less illumination at the peripheral portion of the inner lens, while effectively using the light beams from the plane mirror or reflector. The resulting vehicle lamp can thus be made compact.

According to another aspect of the present invention, there is provided a vehicle lamp comprising: a reflector or mirror of a truncated cone shape having a top opening; a light source mounted within said reflector mirror along the optical axis thereof; and a Fresnel lens having a composite prism cutting having virtual images of said light source as its focal points, said composite prism cutting being made concentric relative to said optical axis.

With the reflector mirror of a truncated cone shape, the incident angles of the light beams relative to the Fresnel lens become very large, because the two virtual images are formed on both sides of the optical axis and the virtual images are positioned deeper than the light source. The difference of light amount is therefore small over the entire surface of the Fresnel lens.

According to a further aspect of the present invention, there is provided a vehicle lamp comprising: a plurality of reflectors or mirrors respectively mounted in correspondence with rectangular portions constituting an illumination surface of said vehicle lamp, each of said reflectors or mirrors having a focal point line in the direction of the longer side of said rectangular portion and having a parabolic cylinder shape; a light source mounted within each of said plurality of reflectors or mirrors, substantially along the optical axis thereof; and a linear Fresnel lens covering said illumination surface and having as its focal point virtual image of said light sources.

With the reflector mirror of a parabolic cylinder, it is possible to make the focal distance short and realize a compact vehicle lamp. Further, since a plurality of light sources are used, the light amount is increased to thereby reduce the unevenness of illumination over the entire surface of the Fresnel lens.

DETAILED DESCRIPTION

Figure 1:
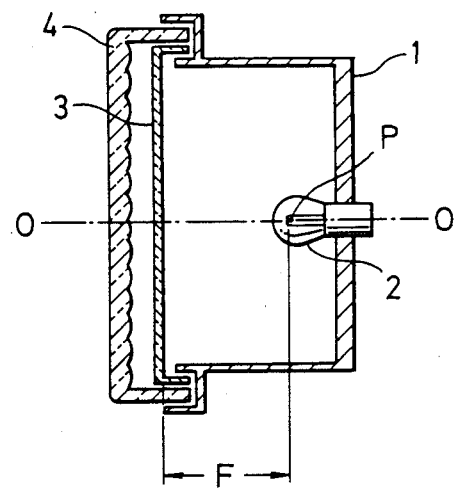
FIG. 1 shows the structure of a prior art vehicle lamp having inner and outer lenses.
Figure 2:
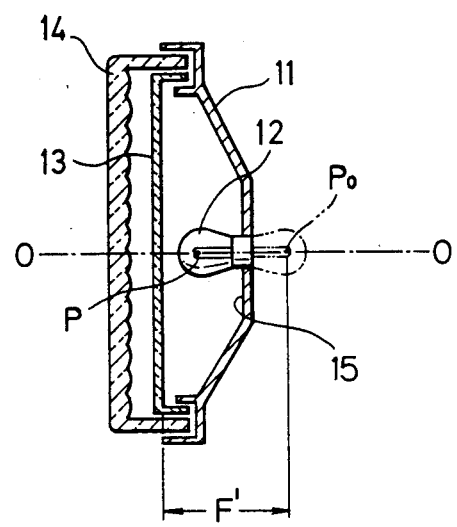
FIG. 2 shows the structure of a vehicle lamp according to a first embodiment of this invention.

The structure of the vehicle lamp of the first embodiment of the present invention is shown in FIG. 2. As seen from FIG. 2, the vehicle lamp of this embodiment comprises a bulb 12 mounted within a housing 11 along an optical axis 0—0, an inner lens 13 which converts light beams emitted from the light emitting point P of the bulb filament into parallel light beams, an outer lens 14 which diverges the transmitted light beams in desired directions, and a reflector surface 15. The reflector 15 is made of a plane mirror or reflector formed at the inner surface of the housing 11 at a position corresponding to the back of the bulb 12, by vapor depositing aluminum thereon or by other suitable means. The inner lens 13 is mounted within the housing at a position spaced by its focal distance F′ from the virtual image point Po of the light emitting point P of the filament of the bulb 12.

Since the virtual image point Po is deeper from the front surface of the vehicle lamp than the filament light emitting point P of the bulb 12, the depth of the housing 11 of the vehicle lamp can be made smaller without causing less illumination at the peripheral portion of the inner lens 13, while effectively using the light beams from the plane mirror or reflector 15.

Figure 3:
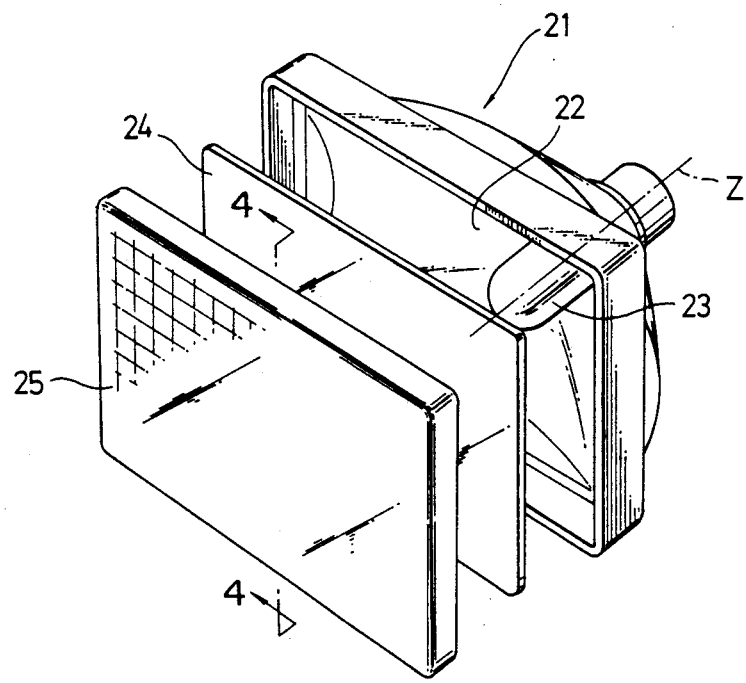
FIG. 3 is a perspective view of a vehicle lamp in a disassembled state according to a second embodiment of this invention.
Figure 4:
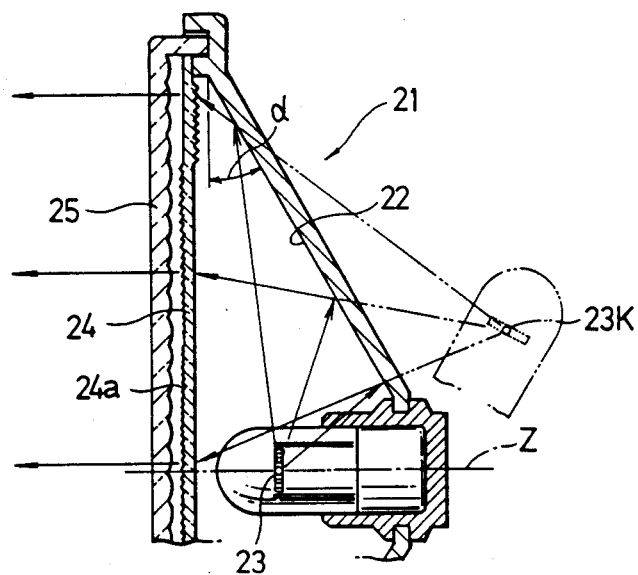
FIG. 4 shows a cross section of the upper portion of the vehicle lamp shown in FIG. 3, taken along line 4—4 in FIG. 3.

FIGS. 3 and 4 show a vehicle lamp according to the second embodiment of this invention. The vehicle lamp generally indicated by reference numeral 21 has a reflector or mirror 22 of a truncated cone shape having a top opening. A light source 23 having a filament is mounted within the reflector 22 along an optical axis Z. A Fresnel lens 24 is mounted in front of the reflector 22 and light source 23.

In front of the Fresnel lens 24, there is mounted an outer lens 25 which can be designed as conventional, so a detailed description therefor is omitted.

FIG. 4 illustrates the design principle of a prism cutting 24a of the Fresnel lens 24, which cutting is determined based on an inclination angle α of the reflector or mirror 22 and the position of the light source 23.

The inclination angle α of the reflector or mirror 22 is determined based on a desired depth of the vehicle lamp 21, the physical dimension of the light source 23, the mounting positions of the Fresnel lens 24 and outer lens 25, and the like. If the vehicle lamp has a rectangular front face, it is obviously desirable to determine the shape of the reflector or mirror 22 so as to provide effective illumination over the entire surface of the Fresnel lens 24.

As seen in FIG. 4, a cross section of the reflector or mirror 22 of a truncated cone shape is represented by a straight line having an inclination angle α, when cut along a plane including the optical axis Z. A virtual image 23K of the light source 23 is located symmetrical to the light source 23 relative to said straight line of the truncated cone shape.

The Fresnel lens 24 has a composite prism cutting 24a including a refraction prism or reflection prism portion having the virtual image 23K as its focal point, the composite prism cutting 24a being made concentric relative to the optical axis Z. Therefore, the light beams directly applied to the Fresnel lens 24 from the light source 23 are made parallel, and the light beams reflected from the reflector or mirror 22 are also made lens 25 which can be designed as conventional, so the detailed description therefor is omitted.

The incident angles of the light beams relative to the Fresnel lens 24 are very large as compared to the conventional lamp, and are nearly 90 degrees, because two such virtual images 23K are formed on both sides of the optical axis Z (one of which is not shown in FIG. 4) and the virtual images are positioned deeper than the light source 23. In addition, the angles do not vary to a large extent. The difference of light amount is therefore small over the entire surface of the Fresnel lens 24.

Further, since a reflector or mirror 22 of a truncated cone shape is used, light beams from the light source 23 reflected at the reflector or mirror 22 are subject to the plane mirror function. Therefore, different from a conventional parabolic reflector mirror, light beams are applied even to the front of the light source 23, thus not generating a shadow of the bulb socket or the like. Furthermore, use of a reflector mirror generally allows a large effective-solid angle of light beams from the light source 23, thereby realizing a bright illumination.

As appreciated from the foregoing description of this embodiment, light beams emitted from the light source are reflected by the reflector or mirror 22 of a truncated cone shape and are applied to the Fresnel lens 24 for converting the light beams into parallel light beams which are incident to the outer lens 25. Therefore, the light amount at the peripheral portion of the inner lens 24 is not reduced to a large extent, and the size of the vehicle lamp can be made compact while giving bright illumination.

Figure 5:
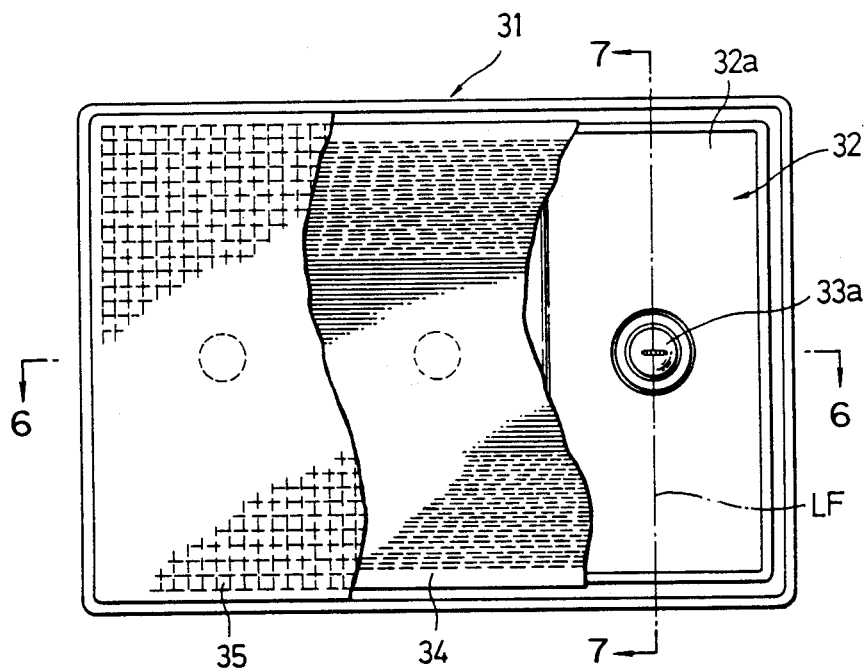
FIG. 5 is a partially broken-away front view of a vehicle lamp according to a third embodiment of this invention.
Figure 6:
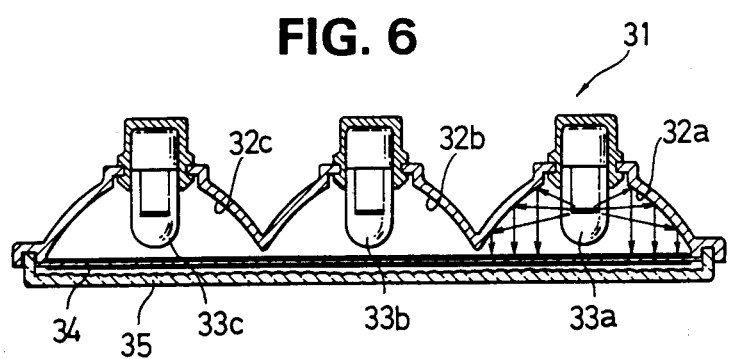
FIG. 6 is a cross section taken along line 6—6 of the vehicle lamp shown in FIG. 5.
Figure 7:
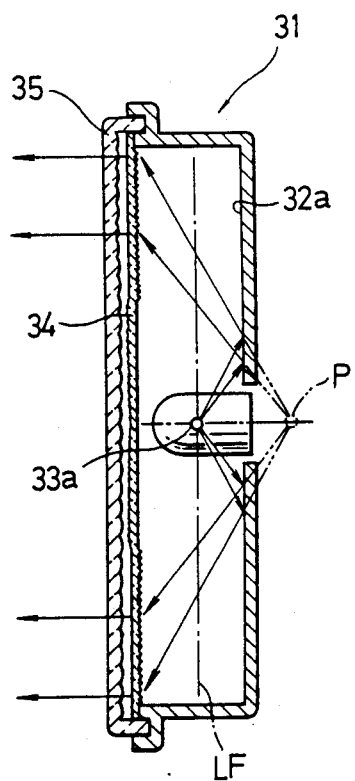
FIG. 7 is a cross section taken along line 7—7 of the vehicle lamp shown in FIG. 5.

FIGS. 5 to 7 show the vehicle lamp according to the third embodiment of this invention. The vehicle lamp, generally indicated by reference numeral 31, comprises a plurality of reflectors or mirrors 32, e.g., in this embodiment, three reflector mirrors 32a, 32b, 32c (see FIG. 6).

The lamp illumination surface is divided into three rectangular portions. Each reflector or mirror 32a, 32b, 32c is made of a parabolic cylinder having a focal line LF (see FIG. 7) in a direction of a longer side of the rectangular portion, i.e., having a curvature only in a direction perpendicular to the longer side. Therefore, even an illumination surface of a rectangular shape having a very large aspect ratio can be effectively illuminated over the entire area thereof.

Light sources 33a, 33b and 33c are mounted within the respective reflectors or mirrors 32a, 32b and 32c substantially along the focal point line LF thereof (see FIG. 7).

The operation of the embodiment of FIGS. 5–7 will be described taking the reflector or mirror 32a and its light source 33a as an example. As shown in FIG. 6, the cross section of the reflector or mirror 32a has a parabolic curvature in the direction of the shorter side of the rectangular shape. Therefore, light beams from the light source 33a are made parallel and are applied to a Fresnel lens 34 which collectively covers all the reflectors or mirrors 32a, 32b and 32c.

In contrast to the above, as shown in FIG. 7, the cross section of the reflector or mirror 32a has no curvature in the direction of the longer side of the rectangular shape. Therefore, light beams from the light source 33a are reflected by the reflector or mirror 32a in a manner quite the same as by a plane mirror. It is thus to be noted that the light beams are apparently emitted from the virtual image P (see FIG. 7) of the light source 33a, the virtual image P being positioned deeper than the light source 33a. The other reflectors or mirrors 32b and 32c are configured and operate in the same manner.

Since the parallel light beams are applied in the horizontal direction (shorter side direction) and the light beams radiated from a point are applied in the vertical direction (longer side direction), the Fresnel lens 34 has a Fresnel function only in the vertical direction. The Fresnel lens 34 is made of a linear Fresnel lens whose Fresnel cutting includes a reflection prism and a refraction prism each having as its focal point the virtual image P on the plane including the focal point line LF and virtual image P, and is extended in the horizontal direction. Consequently, light beams from the light sources 33a, 33b and 33c are all converted into parallel light beams and are applied to an outer lens 35 which has a shape to present a desired divergence property, as is conventional.

With the reflector or mirror of a parabolic cylinder having a parabolic curvature in the horizontal direction and no curvature in the vertical direction, it is possible to make the focal distance short and realize a compact vehicle lamp. Further, since a plurality of light sources can be used, the light amount is increased to thereby reduce the unevenness of illumination over the entire surface of the Fresnel lens, the unevenness otherwise being likely to occur in the case of a compact vehicle lamp of this type.

Further, a rectangular vehicle lamp having a large aspect ratio can be realized by using a relatively small number of reflectors or mirrors constructed as above. Therefore, a compact vehicle lamp with a simple structure can be manufactured without raising its cost.

What is claimed:

1. A vehicle lamp, comprising:
   a reflector or mirror of a truncated cone shape, having an optical axis and a top opening;
   a light source mounted within said reflector or mirror along the optical axis thereof, said reflector or mirror being arranged for producing at least one virtual image point of the light emitting point of the bulb at a position rearward of said bulb; and
   a Fresnel lens having a composite prism cutting having said virtual images of said light source as its focal point, said composite prism cutting being made concentric relative to said optical axis.

2. The vehicle lamp of claim 1, further comprising an outer lens located outside of said Fresnel lens and arranged for receiving light transmitted by said Fresnel lens for diverging said light received from said Fresnel lens in predetermined directions.

3. A vehicle lamp, comprising:
   a bulb mounted within a housing along an optical axis thereof;
   an inner lens having a Fresnel cut surface for transmitting light beams emitted from said bulb in the form of parallel light beams;
   an outer lens for receiving light beams transmitted by said inner lens and for diverging said light beams transmitted by said inner lens in predetermined directions; and
   a plane mirror or reflector on an inner surface of said housing at a position corresponding to the back of said bulb, and arranged for producing a virtual image point of the light emitting point of bulb at a position rearward of said bulb;
   said inner lens being mounted at a position spaced by the focal distance of said inner lens from said virtual image point of said light emitting point of said bulb, thereby reducing the overall depth of the vehicle lamp.

4. A vehicle lamp, comprising:
   a plurality of reflectors or mirrors respectively mounted in correspondence with rectangular portions constituting an illumination surface of said vehicle lamp, said reflectors or mirrors each having a focal point line in the direction of a longer side of a respective rectangular portion and having a parabolic cylinder shape;
   a light source mounted within each of said plurality of reflectors or mirrors, substantially along the optical axis thereof;
   said reflectors or mirrors each being arranged for producing a virtual image point of the light emitting point of each respective light source at a position rearward of the respective light sources; and
   a Fresnel lens covering said illumination surface and having as its focal point the virtual image points of said light sources.

5. The vehicle lamp of claim 4, further comprising an outer lens located outside of said Fresnel lens and arranged for receiving light transmitted by said Fresnel lens for diverging said light received from said Fresnel lens in predetermined directions.

6. The vehicle lamp of claim 5, wherein said Fresnel lens is a linear Fresnel lens.

7. The vehicle lamp of claim 4, wherein said Fresnel lens is a linear Fresnel lens.

* * * * *